Jan. 3, 1956  C. H. GARMAGER  2,729,233
HYDRAULIC RELIEF VALVE
Filed Aug. 3, 1950
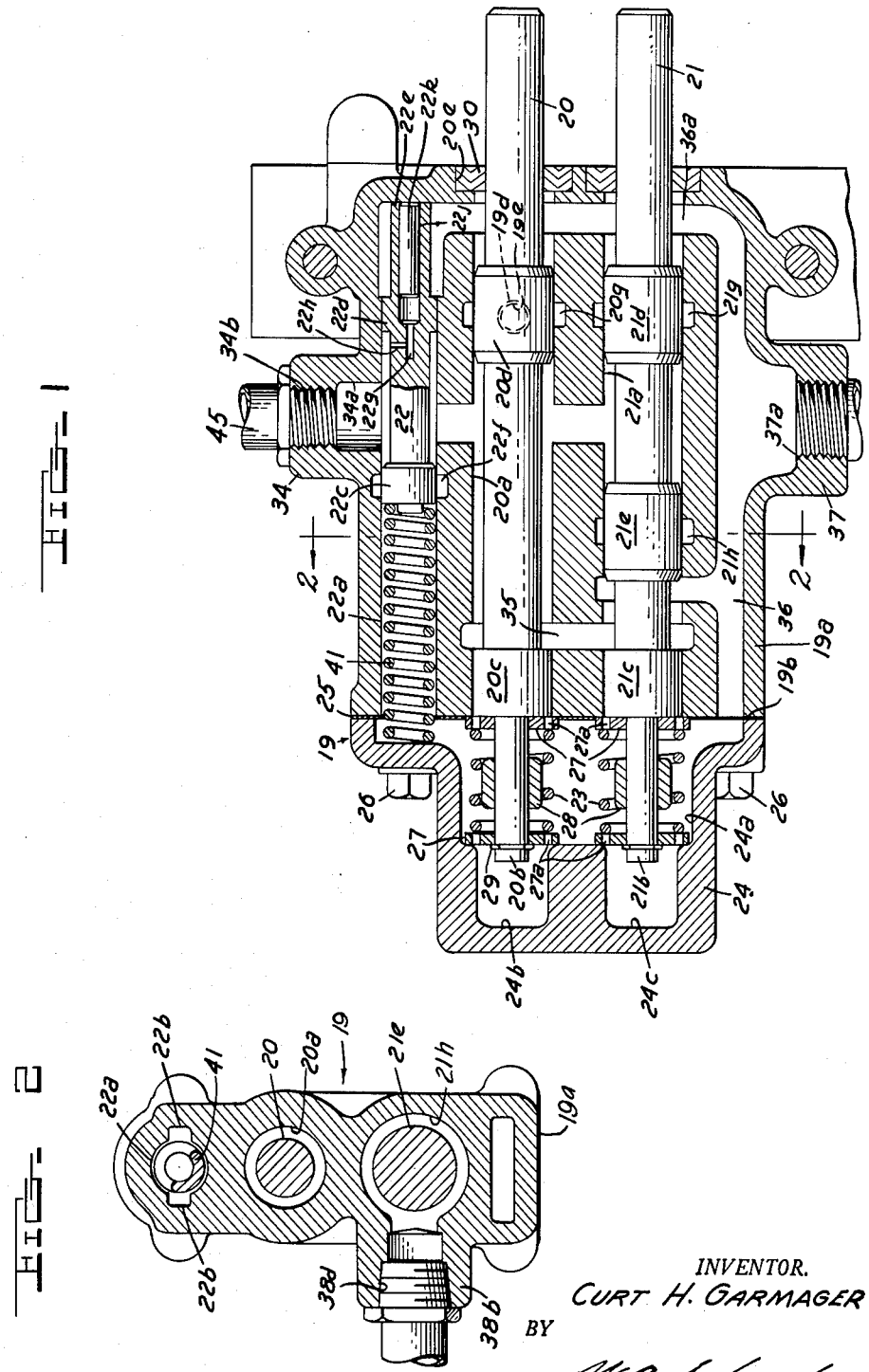
INVENTOR.
CURT H. GARMAGER
BY
ATTORNEY

United States Patent Office 2,729,233
Patented Jan. 3, 1956

2,729,233

HYDRAULIC RELIEF VALVE

Curt H. Garmager, Royal Oak, Mich., assignor, by mesne assignments, to Ford Motor Company, Dearborn, Mich., a corporation of Delaware Application August 3, 1950, Serial No. 177,498

3 Claims. (Cl. 137—494)

This invention relates to an improved construction for a relief valve which permits a smaller spring to be utilized and which provides more accurate pressure limitation than prior constructions.

A particular embodiment of this invention is illustrated on the annexed sheets of drawings in an auxiliary hydraulic valve structure having a plurality of control elements.

On the drawings:

Fig. 1 is a longitudinal sectional view of a valving structure embodying the new hydraulic relief valve.

Fig. 2 is a cross sectional view taken along the plane 2—2 of Fig. 1.

As shown on the drawings:

A valving structure in which the hydraulic relief valve may be used is generally indicated at 19. Valve 19 essentially comprises a main body casting 19a and a pair of slide valves 20 and 21. A first bore 20a is provided in body portion 19a in which valve 20 is slidably inserted. A second bore 21a is provided in body portion 19a, parallel with bore 20a, in which is slidably inserted a valve 21. A novel pressure relief valve 22 is inserted within a third bore 22a in body portion 19a also parallel with bore 20a.

The left end face 19b of body portion 19a is milled off perpendicular to the axes of the various bores. A cup-shaped cap 24 is bolted to such squared off end face 19b as shown in Figure 1. Cap 24 has a hollow interior 24a to admit hydraulic fluid as will be later described. A recess 24b is provided in the bottom of hollow portion 24a in axial alignment with bore 20a in valve body 19a and another recess 24c is provided in the cap 24 in axial alignment with bore 21a. A gasket 25 is placed between the perimeters of valve end face 19b and cap 24, and a plurality of peripherally spaced bolts 26 secure cap 24 to valve body 19b, gasket 25 preventing the escape of hydraulic fluid between the members so joined.

Valve 20 comprises a cylindrical member having a reduced diameter inner end 20b. Such end normally projects out of bore 20a into the hollow portion of cap 24. Adjacent the reduced diameter end there is provided a piston-like portion 20c which cooperates with bore 20a to provide a fluid seal with the bore. A second piston-like portion 20d is provided on valve 20 axially spaced from piston portion 20c and adjacent the outer end of valve 20 which also fits snugly in bore 20a.

A washer 27 surrounds reduced diameter end 20b of valve 20 and is placed adjacent the piston portion 20c and in abutment with the squared end surface 19b of valve body 19a. A sleeve-like spring guide 28 surrounds reduced diameter end 20b and is floatable on such reduced diameter end. A second washer 27 is retained on the extreme end of reduced diameter end 20b by a snap ring 29 inserted in a suitable annular groove provided on such reduced diameter end. Washer 27 abutting such ring likewise abuts the adjacent surface about recess 24b. A spring 23 surrounds the reduced diameter end 20b and spring guide 28 and is compressed between washers 27 to normally maintain such washers respectively in abutment with surfaces 19b and the surface surrounding recess 24b, and thus maintain a resilient bias on slide valve 20 against displacement inherent in either direction. It should be mentioned here that each of the washers 27 is provided with a plurality of transverse fluid passages 27a. The outer end of bore 20a is counterbored at 20e and an annular fluid seal 30 surrounding valve 20 is forced into such counterbore.

Valve 21 is constructed similarly to valve 20. A reduced diameter left end portion 21b is provided and a similar spring 23, spring guide 28 and washers 27 surround such reduced diameter end and are similarly arranged and secured as for the valve 20. A piston portion 21c is provided on valve 21 corresponding to piston portion 20c of valve 20. A second piston portion 21d corresponding to piston portion 20d is provided near the outer end of valve 21. However, a third piston portion 21e is provided on valve 21 axially spaced inwardly from piston portion 21d for a purpose to be later described. Valves 20 and 21 are slideably moved within bores 20a and 21a by conventional lever means not shown.

An integral cylindrical boss (not shown) is provided on the right side of the valve body 19a, and an axial bore 19d formed therein which communicates with an annular recess 20g formed in bore 20a. The outer end of bore 19d is threaded as shown at 19e to receive a conduit (not shown) which connects to a hydraulic cylinder (not shown) to be controlled by valve 20. Piston portion 20d of valve 20 normally overlies recess 20g and the inner end of bore 19d to block passage of fluid through such bore.

A boss 34 is provided on top of valve body 19a, and an axial bore 34a is provided in such boss and extends transversely in the body portion 19a. The outer end of bore 34a is threaded as at 34b to receive a conduit 45 from a pump source not shown. Bore 34a communicates transversely with longitudinally disposed bores 20a, 21a and 22a to admit pressured fluid from the pump source to such bores at points inwardly of piston portions 20d and 21d. A cored transverse fluid passageway 35 is provided adjacent the inner ends of bores 20a and 21a in communicating relationship therewith and located outwardly of piston portions 20c and 21c. Another cored longitudinal fluid passageway 36 is provided adjacent the bottom of valve body 19a and such passageway extends to the right hand edge of valve body 19a and thence projects upwardly as shown at 36a in communicating relationship with bores 20a and 21a, outwardly of piston portions 20d and 21d, and with the third longitudinally disposed bore 22a. Passageway 36 likewise communicates with the hollow interior 24a of cap 24 as does bore 22a at the upper end of the valve body 19a. An integral boss 37 is provided on the bottom side of valve body 19a in alignment with bore 34. An axial threaded bore 37a is provided in boss 37 which communicates with passageway 36 and such threaded bore permits connection of a conduit thereto to permit hydraulic fluid to return to the sump of the pump source.

A pair of spaced integral bosses of which only one is shown, 38b, are provided on the left hand side of body 19a and such bosses are aligned with the axis of the bore 21a. A pair of axial ports of which only one is shown, 38d, are respectively provided in such bosses which communicate transversely with annular recesses 21g and 21h in bore 21a. The outer end of each of these ports are counterbored and threaded whereby suitable conduits may be connected to such bosses to deliver pressured hydraulic fluid, for example, to a double acting hydraulic cylinder.

The novel pressure relief valve 22 comprises a rod-like member having an enlarged diameter piston portion 22c on the left hand end thereof, as viewed in Figure 1, and an enlarged diameter head portion 22d on the right hand end thereof. Both piston portion 22c and head portion 22d cooperate with bore 22a in fluid sealed relationship. The right hand end portion 22e of the valve 28 normally contacts the extreme right hand wall of passageway 36a as shown in Figure 1, such contact being maintained by a spring 41 inserted within the left hand end of bore 22a and bearing respectively against cap 24 and the left hand face of piston portion 22c, as shown in Figure 1. An annular recess 22f is formed in bore 22a which is overlapped by piston portion 22c in the normal position of relief valve 22. The bore 22a is further provided with longitudinally extending by-pass slots 22b running from annular recess 22f to the left end of bore 22a.

The pressured hydraulic fluid from the pump source is connected to the inlet port of valve 19 through a conduit 45 threaded into threaded hole 34b in boss 34, and hence is supplied to the medial portions of all three bores 20a, 21a and 22a. An axial recess 22g is provided in the stem portion 22e of relief valve 22 and a radial hole 22h communicates between the innermost end of recess 22g and the exterior of the rod-like pressure relief valve 22 to admit pressure fluid to axial recess 22g. Axial recess 22g is counterbored as shown at 22j and a rod-like seal member 22k is snugly but slidably contained in counterbore 22j. Piston 22k normally contacts the wall of passageway 36a as shown in Fig. 1 under the influence of the fluid pressure acting against its left end face. The spring force is opposed by the fluid pressure acting on the unbalanced end area of recess 22a and counterbore 22j. When the pressure within the valve exceeds a predetermined value, the fluid forces acting on valve 22 will then force the valve to move to the left, thereby uncovering annular port 22f as the piston portion 22c moves to the left and the pressured fluid will pass therethrough into longitudinal by-pass slots 22b, and thence through the hollow interior 24a of cap 24 and back to the sump. Spring 41 returns valve 22 to its normal port sealing position after the pressure drops below the allowable limit.

The improved performance of the described construction of the relief valve 22 will be more apparent when the deficiences of conventional constructions are first considered. In the ordinary relief valve, it is customary to employ a relatively large size valve member which is held in fluid sealed relationship with respect to an annular port by a spring. However, in prior constructions of relief valves, substantially the entire cross sectional area of the valve member was exposed to the pressured fluid. Accordingly, in relatively high pressure applications, the spring employed to hold such valve in its closed position had to be quite stiff and of substantial size. In applications where there are wide variations in the output volume of the pump supplying pressure fluid to the hydraulic system, such conventional relief valve was highly inaccurate in limiting the maximum pressure produced in the hydraulic system. In applications such as described here where the hydraulic pump is driven by an engine whose speed is controlled primarily by other considerations than the operation of the hydraulic system, it is obvious that the output of fluid from such pump will vary over a wide range depending upon the arbitrary speed of the engine that the operator happens to utilize. With the conventional check valve, the relief valve will initially open when the pressure reaches the predetermined pressure limit. If the engine is then immediately speeded up, it is apparent that the valve must further open to a substantially greater extent to by-pass the additional fluid coming from the pump source. Hence, the valve spring must be further compressed, and with the stiff springs that were heretofore required, this means that the total fluid pressure in the hydraulic system would substantially increase. In some operations, it has been observed that the pressure would be permitted to build up by the described conventional type relief valve to more than double the desired maximum value.

With the described construction, it will be noted that all of the advantages of a relatively large annular discharge port are retained, however, the spring 41 need only be so large as to oppose the fluid pressure forces acting upon the end areas of recess 22 and counterbore 22j. Since this end area can be made quite small in relationship to the diameter of the port sealing piston portion 22c, it is apparent that a relatively light spring may be employed, and this necessarily means that the additional force required to produce further compression of such spring to shift the piston portion 22c to its full open position will only be slightly greater than the force required to initially shift the piston portion 22c to crack the relief valve. In short, the described relief valve construction permits the relief valve to be designed with a large discharge passage, but eliminates the necessity for a large and stiff spring to hold the relief valve in its closed position.

*Operation*

In the normal position of the valves illustrated in the drawings, the pressured hydraulic fluid entering through inlet port 34a merely passes around pressure relief valve 22 through tranverse bore 34 into longitudinal bore 20a, thence through passage 35 and return to the reservoir through passageway 36. A hydraulic cylinder (not shown) may be actuated by movement of valve 20. When the valve 20 is moved to the right, as viewed in Fig. 1, piston portion 20d then uncovers annular port 20g while piston portion 20c blocks off passageway 35. Pressured fluid than can only enter port 19d to actuate the cylinder. Upon release of valve 20, spring 23 returns the piston portions 20c and 20d to their normal positions, thus the fluid contained in the cylinder is held therein as port 19d is blocked off, preventing escape therefrom. By moving the valve 20 in the opposite direction as shown in Fig. 1, whereupon port 19d is placed in communication with sump passage 36a and the fluid contained in the cylinder escapes through passageway 36a to return to the reservoir or sump.

A double acting cylinder (not shown) may be actuated by the movement of the valve 21. Movement of valve 21 to the left as shown in Fig. 1, whereupon port 38d is exposed to pressured fluid while the other port, which is not shown, is connected to the sump. Reverse movement of valve 21 will uncover the ports, Such movement permits pressured fluid to enter the right hand port, which is not shown, while fluid may escape from left hand port 38d to return to the sump through passageway 35a.

When an excess of pressure is built up within the valve 19, hence in any part of the hydraulic system, pressure relief valve 22 will act to reduce such excess pressure to a safe value.

From the above description, it is apparent that dangerous overloading of a hydraulic valve is prevented by this novel pressure relief valve.

It will, of course, be understood that various details of construction may be varied through a wide range without departing from the principles of this invention and it is, therefore, not the purpose to limit the patent granted hereon otherwise than necessitated by the scope of the appended claims.

I claim:

1. A relief valve for connection between a fluid pressure source and a sump comprising a casing defining a bore, a valve body slidably mounted in said bore and having axially spaced piston portions cooperating with said bore in fluid sealing relationship and a reduced diameter portion intermediate the said piston portions cooperating with said bore to define a chamber, means for connecting said chamber to the fluid pressure source, port means in one end of said bore normally obturated by one of said piston portions for connection to the sump, a spring urging said valve body axially toward said other end of said bore to normally abut one end face of said valve body therewith, said valve body having an axial recess in said one end face thereof, a piston slidably inserted in said axial recess in sealing relation therewith, and conduit means in said valve body connecting the inner end of said axial recess with said chamber, whereby the force of said spring is opposed only by fluid pressure acting on an effective area on said valve body equal to the cross sectional area of said axial recess.

2. A relief valve comprising a hollow casing adapted to receive pressured fluid therein, means defining an annular pressure relief port in said casing, a valve body shiftably mounted in said casing and having axially spaced lands cooperating with said port in fluid sealing relationship and a reduced diameter portion intermediate of said lands cooperating with said port to define an inlet chamber, said valve body having one portion thereof movable into obturating relationship with said annular port, a spring biasing said valve body to said obturating position, said valve body having an open-ended recess therein of substantially less diameter than said one portion of the valve body and disposed in axial alignment with the path of movement of said valve body, a plug slidably inserted in said recess, means for limiting movement of said plug relative to said casing, and conduit means in said valve body for supplying said recess with the pressured fluid within said casing, whereby the fluid pressure on the end area of said recess constitutes the only unbalanced fluid pressure force opposing said spring.

3. A relief valve comprising a casing defining a bore, port means for supplying pressured fluid to the medial portions of said bore, a valve body shiftably mounted in said bore, axially spaced means on said valve body respectively normally sealing both ends of said bore against fluid discharge therefrom, means at one end of said bore providing an annular discharge port openable by axial outward movement of said valve body, a spring urging said valve body inwardly, said valve body having an axially extending recess therein opening in the other end of said bore, a piston-like plug slidably inserted in said recess in fluid sealing relationship, means for limiting movement of said plug relative to said casing, and conduit means in said valve body for supplying said recess with the pressured fluid within said casing, whereby the fluid pressure on the end area of said recess constitutes the only unbalanced fluid pressure force opposing said spring.

References Cited in the file of this patent

UNITED STATES PATENTS

| | | |
|---|---|---|
| 971,982 | Ford | Oct. 4, 1910 |
| 1,532,907 | Long | Apr. 7, 1925 |
| 1,959,909 | Farmer | May 22, 1934 |
| 2,103,299 | Ravnsbeck | Dec. 28, 1937 |
| 2,200,824 | Herman | May 14, 1940 |
| 2,244,213 | Patton | June 3, 1941 |
| 2,289,567 | Berglund | July 14, 1942 |
| 2,313,056 | Emerson et al. | Mar. 9, 1943 |
| 2,326,462 | Johnson | Aug. 10, 1943 |
| 2,392,421 | Stephens | Jan. 8, 1946 |
| 2,392,422 | Stephens | Jan. 8, 1946 |
| 2,456,320 | Repke | Dec. 14, 1948 |
| 2,489,435 | Robinson | Nov. 29, 1949 |